Feb. 26, 1963 H. K. WILD 3,079,597

BYTE CONVERTER

Filed Jan. 2, 1959

4 Sheets-Sheet 2

Feb. 26, 1963 H. K. WILD 3,079,597

BYTE CONVERTER

Filed Jan. 2, 1959 4 Sheets-Sheet 4

United States Patent Office 3,079,597

Patented Feb. 26, 1963

3,079,597

BYTE CONVERTER

Herbert K. Wild, Poughkeepsie, N.Y., assignor to International Business Machines Corporation, New York, N.Y., a corporation of New York Filed Jan. 2, 1959, Ser. No. 784,669

19 Claims. (Cl. 340—347)

This invention relates to computers, more particularly to methods of and means for transforming input bytes each having a predetermined number of bits into output bytes having a different number of bits.

The present invention is particularly useful in connection with computers and computing systems having associated therewith a number of peripheral units. Such peripheral units, from which may be developed "words," program instructions, and the necessary input data to be operated upon by the computer, will have outputs in terms of bytes which from the different units may include bits in differing number. For example, the flow of information to the computer may be by way of serially produced bytes each including six bits. Where the computer system includes arrangements for utilizing sub-multiples of a sixty-four bit "word," for example, sub-multiples of eight bits each, the main memory of such a machine for "words" of sixty-four bits may be efficiently utilized if the main memory can be filled with eight bytes of eight bits to form each sixty-four bit "word." Where, however, the information from a peripheral or associated unit has an output of bytes each made up of other than a sub-multiple of sixty-four, as for example, bytes each including six bits, the main memory of the machine cannot be fully utilized. The result will be a lessened efficiency of operation for the computer as a whole.

From the foregoing discussion, it will be seen that the word "byte" is herein used to define bit-groups made up of selected numbers of bits. For example, when the output from a peripheral unit appears in groups of bits, each such group will form an input byte to the byte converter of the present invention.

It is an object of the invention to provide a method of and a means for utilizing one or more information channels for transmission to storage of bit-groups which may differ in their number of bits from the bit-groups in successive bytes transmitted by each channel.

It is a further object of the present invention to convert input bytes of any given number of bits to output bytes which are sub-multiples of the number of bits required to make full use of the main memory of the computer.

It is a further object of the invention to utilize a plurality of magnetic cores in number at least equal to the least common multiple of the number of bits in an input byte and the number of bits in an output byte with the cores disposed in control circuits for storing in accordance with the magnetic state of each core information representing either of the two notations for each bit in each input byte and for thereafter developing the corresponding information in output bytes having a differing number of bits.

It is a further object of the invention to provide in conjunction with the byte converter a parity byte generator which in association with odd-even counters and a compare circuit provides continuous check on the operation of the byte converter.

In carrying out the present invention in one form thereof, there are provided magnetic cores and associated control circuits which may be drawn or represented in various selected symmetrical arrays and which are characterized by the requirement that for a like notation for each bit of an input byte there will appear at a single core two half-write currents for changing the magnetic state of that core. Thus for an input byte of six bits, six cores will have their magnetic states changed or not changed, depending upon the presence of a "one" or a "zero," the two notations most used in the binary system, for each bit of the input byte. There will then be applied to six additional cores half-write currents to produce magnetic states corresponding with the respective notations for each bit of the second input byte. Read-out circuits including a number of cores corresponding to the bits desired in the output byte are arranged to reproduce in an output byte the information corresponding with the bits in the first byte and a selected fraction of the bits in the second byte.

As will later be explained more in detail, the symmetrical array of magnetic cores may be represented by a cylinder with the cores located at the intersections between a plurality of circles thereon and lines equally spaced one from the other about the periphery; and by cores located at the intersections of spaced parallel lines forming columns and rows. Associated with each symmetrical array will be a plurality of read-in circuits and read-out circuits and which in the row and column arrangement will be referred to as diagonal circuits. The row and column arrangement may be taken as a developmental drawing of the cylindrical array.

In addition to the diagonal circuits, there will be a circuit for each core corresponding with each row and each column. By suitably applying half-write electrical signals to the respective circuits, there may be stored upon the several cores information representative of the respective bits of each input byte. By reason of the arrangement of diagonal read-out circuits, there may be obtained therefrom output bytes having a number of bits differing from those of the input bytes.

In the preferred form of the invention, the number of magnetic cores will correspond with the least common multiple of the number of bits in an input byte and in an output byte. Thus if there are six bits for an input byte and eight bits for an output byte, twenty-four magnetic cores will be used. If the input and output bytes respectively include five bits and six bits, there will be required thirty magnetic cores.

For further objects and advantages of the invention, for a detailed explanation of the checking circuit, and for a more detailed development of the principles of the invention by means of which systems may be designed for any selected number of bits in the input and output bytes, reference is to be had to the following detailed description taken in conjunction with the accompanying drawings, in which.

Figure 1:
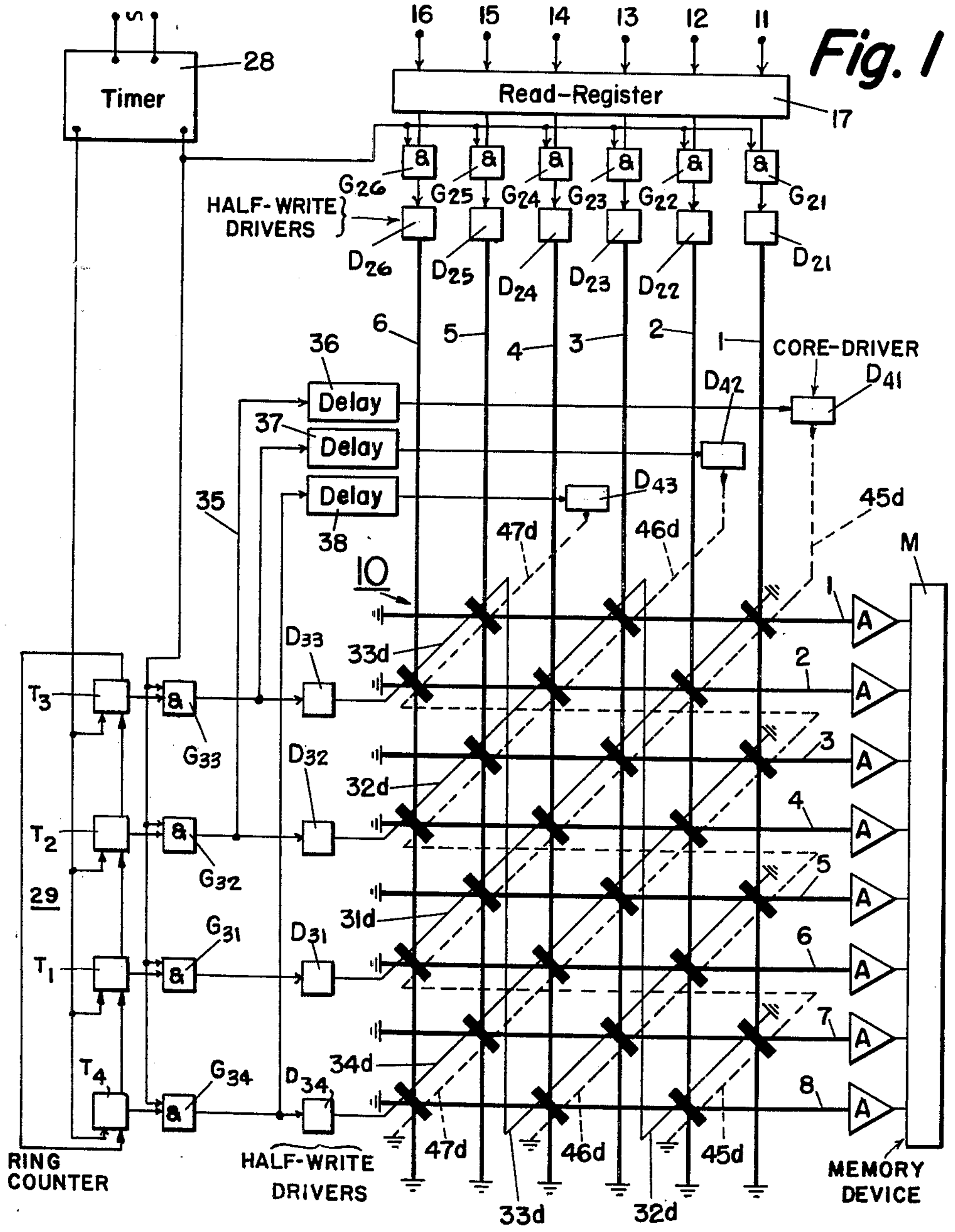
FIG. 1 is a circuit diagram of a six-bit byte to an eight-bit byte core matrix converter.

Referring to FIG. 1, there has been illustrated a matrix 10 for converting input bytes each including six bits into output bytes each including eight bits. The matrix system includes twenty-four magnetic cores corresponding in number to the least common multiple of the number of bits in an input byte and the number of bits in an output byte. The magnetic cores, represented by conventional symbols, are shown disposed in a symmetrical array made up of six vertical columns and eight horizontal rows. The columns, corresponding with input circuits, have been numbered from right to left, and the eight rows, corresponding with output circuits, from top to bottom.

The magnetic cores of the present invention are preferably of the type used in memory devices. They have hysteresis loops which approach a rectangular configuration, that is to say, the magnetic cores are preferably of the type which possess high remanence. When magnetomotive forces are applied to produce saturation in one direction, the cores will be set to a condition of high remanence in the corresponding direction. The later application of pulses in the same direction will produce a minimal change of flux. When, however, a magnetizing force is applied in the opposite direction and of adequate magnitude to produce saturation, the magnetization of the core will be reversed and will remain magnetized in said opposite direction. Thus, each time a core is driven from one magnetic state to the other magnetic state, a relatively large flux change occurs.

The intersections of the columns and rows as illustrated by the cross-over points of corresponding conductors 1–6 and 1–8 form a rectangular grid or matrix. When the least common multiple is equal to the input byte multiplied by the output byte there will be a magnetic core located at each intersection. When the least common multiplier is less than the aforesaid product, fewer cores are required. As shown in FIG. 1, there is a core at each intersection of an odd-numbered column with each odd-numbered row. Thus in row 1, cores are located at columns 1, 3 and 5. Similarly, a core is located at each intersection of an even-numbered column with an even-numbered row. Thus, cores in row 2 are located at columns 2, 4 and 6.

Information is read into the core matrix 10 by application thereto of a succession of bytes each consisting of six bits. Each bit may be represented by either a "zero" or a "one." For convenience, it will be assumed the presence of an input current will represent a "one," and the absence of an input current will represent a "zero." The input groups of bits or bytes may be derived from information stored on magnetic tape or otherwise generated in manner well understood by those skilled in the art. Such groups in the form of electrical pulses are applied in succession to a read-register 17 by way of input terminals 11–16.

As will be later explained, there are to be produced coincidentally half-write currents under the control of the read-register 17 and also half-write currents under the control of a circuit controller 29 of the ring type which includes stages $T_1$–$T_4$. In order to obtain such coincidence, there are provided gates $G_{21}$–$G_{26}$ and gates $G_{31}$–$G_{34}$ respectively formed by AND circuits. When there are applied to gates $G_{21}$–$G_{26}$ input signals both from read-register 17 and from a timer 28, the gates are opened to transfer signals representative of the bits stored in the read-register 17 to signal-producing means $D_{21}$–$D_{26}$. The signal-producing means $D_{21}$–$D_{26}$ will hereinafter be referred to as half-write drivers.

In response to the opening of gates $G_{21}$–$G_{26}$, each of drivers $D_{21}$–$D_{26}$ receiving a signal representative of a "one" will produce an output current pulse but of insufficient magnitude to change the state of magnetization of a core. For this reason, the current pulses produced in each of input circuits 1–6 for each one-bit will be referred to as a "half-write current." The input circuits 1–6 are magnetically coupled to all of the cores respectively in their corresponding columns. The magnetic coupling may be by way of a coil wrapped about the core, or it may comprise the extension of the conductor through an opening in the core.

The output circuits preferably terminate at amplifiers each responsive to the sense or direction of an output pulse applied thereto. Each output circuit is magnetically coupled to all of the cores in each corresponding row. Thus, the first row includes the three cores located at odd-numbered columns 1, 3 and 5, while the next three cores are located at even-numbered columns 2, 4 and 6 of the second row.

In addition to the input and output circuits, there are magnetically coupled to each core additional circuits which in the symmetrical arrangement of FIG. 1 may be referred to as diagonal circuits. For clarity, corresponding or similar diagonal circuits are shown by solid lines with other and different diagonal circuits shown by broken lines, it being understood that the broken-line circuits are representative of continuous conductors. The solid-line diagonals represent circuits for half-write currents, and the broken-line diagonals represent read-out circuits, that is, circuits by means of which there may be applied, as by coils included therein, read-out currents of magnitude adequate to change the magnetic state of each core.

It will now be assumed that the respective cores are in corresponding first stable states and that there is to be applied to the register 17 a byte of six bits and that it is desired to enter that byte into the core matrix 10. It will be further assumed that the byte to be entered is the first of a series time-spaced one from the other. Because of tape skew, or to other causes, the bits may not be simultaneously applied to register 17. As already noted, however, after the last bit of the first byte is entered, the gates $G_{21}$–$G_{26}$ are opened for simultaneous application of signals to the drivers $D_{21}$–$D_{26}$. Thus the drivers $D_{21}$–$D_{26}$ produce simultaneously the half-write currents for the six columns. There is simultaneously produced a half-write current for the first diagonal circuit *31d*. Thus, a pulse from timer 28 not only opens gates $G_{21}$–$G_{26}$, but it coincidentally opens gates $G_{31}$–$G_{34}$ for application of a control pulse to one of drivers $D_{31}$–$D_{34}$.

Coincidentally with the production of a timer control pulse, the first stage $T_1$ of the circuit controller 29 is energized to deliver through gate $G_{31}$ a pulse to driver $D_{31}$. This "half-write" driver thereupon produces in diagonal circuit *31d* a half-write current.

Thus at each core there will be for each bit corresponding with a "one" two half-write currents. The two half-write currents produce on each such core magnetomotive forces of magnitude which switches or changes the magnetic state of the core from its first state to its second state.

It is emphasized that though the stage $T_1$ of controller 29 causes half-write driver 31 to produce in the diagonal circuit *31d* a half write current for producing on each of its cores a magnetomotive force in a direction to change them from said first state to said second state, only the cores will be switched where there is present an aiding magnetomotive force from the input circuits 1–6 representative of "ones" in the input byte.

It will be noted that the diagonal circuit *31d* is associated with six magnetic cores, each of which is included in a different one of the six input circuits. Accordingly, if in the core in row 1, column 1, there should be applied thereto a half-write current from driver $D_{21}$ coincidentally with the application thereto of a half-write current from core driver $D_{31}$, the sum of the resultant magnetomotive forces will change that core from its said first magnetic state to its second magnetic state.

At the beginning of the operations now being described all magnetic cores were assumed to be in corresponding first states. Besides the core at column 1, row 1, other cores in the diagonal circuit *31d* will be selectively changed from their first state to their second state depending upon whether the corresponding input bit is a "zero" or a "one." If at input circuit 2 the bit is a "zero," there will be an absence of a half-write current from that input circuit. The half-write current of diagonal *31d* will be insufficient to change the magnetic state of the core at column 2, row 2. Thus, after application of the half-write currents, the six cores of diagonal *31d* will have magnetic states representative of the information carried by the first byte made up of six bits.

As soon as the read-register 17 is cleared of the first input byte, the second byte may be entered since gates $G_{21}$–$G_{26}$ are opened only during the clearing of the register. After entry of the second byte, a second pulse from timer 28 again opens gates $G_{21}$–$G_{26}$ and gates $G_{31}$–$G_{34}$. At the same time the timer actuates the controller 29 to produce from its second stage $T_2$ a pulse through the gate $G_{32}$ for driver $D_{32}$. The half-write driver $D_{32}$ then produces a half-write current for a second diagonal circuit 32*d*. This diagonal 32*d* is, in FIG. 1, shown in two parts, the part nearer driver $D_{32}$ including four cores, and the part remote from that driver including the two lower right-hand cores of the matrix. The half-write current for diagonal circuit 32*d* is produced coincidentally with the half-write currents from the drivers $D_{21}$–$D_{26}$ respectively operated under the control of the bits from the register 17 making up the second input byte. If the bit applied to input terminal 16 corresponds with a "one," then there will be applied to the core at column 6, row 4, two half-write currents to change that core from its first state to its second state. Depending upon whether there be present a "zero" or a "one," the remaining five cores at columns 1 and 2, rows 7 and 8, and columns 3–5, rows 1–3, will determine their final states.

It may now be observed that in respect to the eight output circuits, the magnetic states of a single core included in each said circuit have been determined by the character of the six bits forming the first input byte and by two of the bits forming the second input byte. These cores are the six included by diagonal circuit 31*d* and by the lower right-hand cores of diagonal circuit 32*d*. Accordingly, there may now be produced an output byte consisting of eight bits. Such an output byte is produced by utilizing the output pulse appearing at the output of gate $G_{32}$. This output pulse is applied by way of circuit 35 to a delay means, such as a delay line 36.

Figure 1A:
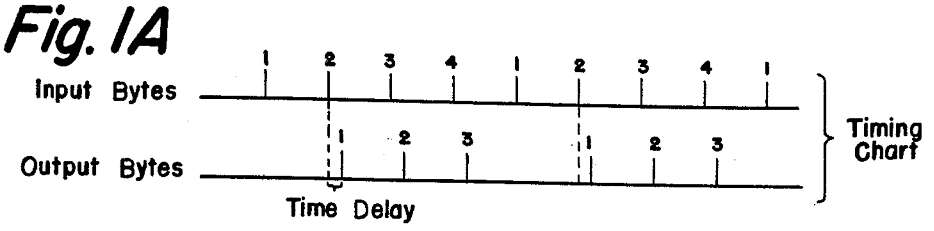
FIG. 1A is a timing diagram useful in obtaining an understanding of the operation of the circuit of FIG. 1.

After a time interval or, FIG. 1A, a "Time Delay" sufficient for changing the magnetic states of selected cores as described above, the pulse applied to delay line 36 is transmitted to a read-out core-driver $D_{41}$. The core-driver $D_{41}$ produces in a diagonal read-out circuit 45*d* a current pulse of magnitude adequate to change the magnetic state of the respective cores in that diagonal circuit. The pulse will have a direction tending to restore the magnetic state of each core from its second state to its first state, that is to say, in a direction opposed to the state produced by the coincidence of two half-write currents. Thus, if the core for column 2, row 8 had been set to its second state, the read-out current will return it to its first state, thus producing a large and substantial change of flux in the core. This large change of flux will produce an output pulse in the output circuit 8 of relatively large and substantial magnitude. If, on the other hand, the core at column 1, row 7 had not been changed to its second state, the read-out pulse would cause a minor change of flux. That change of flux will be so small that the output from output circuit 7 may be considered as zero and representative of a "zero." An amplifier is included in line 8 which is responsive only to pulses produced when a core is switched from its "zero" to its "one" state. In this manner, there will be entered into the storage or memory device M a "one" from the core, column 2, row 8, and a "zero" from the core at column 1, row 7.

In similar manner, the read-out pulse of diagonal circuit 45*d* traverses the six cores associated with diagonal 31*d* so that there are produced output pulses or the absence of such pulses in the corresponding output circuits 1–6. Thus, the eight-bit output byte as appearing at output circuits 1–8 may be applied directly to the memory device M of a computer for which bytes of eight bits each are sub-multiples of its "word" capacity of sixty-four bits. In this manner, the memory device is used to the full extent of its capacity. There is avoided any loss in efficiency of the computer as a whole by reason of the fact that a peripheral or associated device produces outputs in the form of six-bit bytes.

Continuing with the operation of the matrix of FIG. 1, after the second stage $T_2$ has functioned as described above, the timer 28 again opens gates $G_{21}$–$G_{26}$ and $G_{31}$–$G_{34}$ and advances controller 29 to stage $T_3$. Thus after the third input byte has been entered into register 17, half-write currents from the third half-write driver $D_{33}$ are applied to a diagonal circuit 33*d* and, accordingly, the half-write currents again developed by half-write drivers $D_{21}$–$D_{26}$ in conjunction with those from driver $D_{33}$ control the magnetization of the six cores respectively located at the intersections of columns 1–6 with rows 5–8 and rows 1 and 2.

The control pulse from the third stage $T_3$ of controller 29 is applied to delay line 37 which after a time interval applies a control pulse to the second read-out core driver $D_{42}$. The read-out pulse produced thereby traverses a divided diagonal read-out circuit 46*d*, thus to produce from the cores located at the intersections of columns 1–6 with rows 5–8, 1–4, a second output byte of eight bits.

After the read-out of the second output byte of eight bits, the timer 28 again opens gates $G_{21}$–$G_{26}$ and $G_{31}$–$G_{34}$ and advances the controller 29 to stage $T_4$. A fourth input byte entered into register 17 now energizes the half-write driver $D_{34}$ to apply a half-write current to the cores disposed along diagonal circuit 34*d* coincidentally with any half-write currents developed by the half-write drivers $D_{21}$–$D_{26}$.

After a time delay imposed by a delay line 38, a third read-out driver $D_{43}$ applies to a diagonal circuit 47*d* a current pulse in direction to return the magnetic cores associated with said diagonal circuit to their first states. There is thus produced a third output byte of eight bits corresponding with the four six-bit bytes theretofore applied. Thereafter, the timer 28, after a short delay, greater than that imposed by delay line 38, transfers the control circuit from the fourth stage $T_4$ to the first stage $T_1$ and again opens the gates $G_{21}$–$G_{26}$ and $G_{31}$–$G_{34}$ for read-out from the register 17 of the fifth input byte. The system functions as described above for the fifth input byte and for the succession of input bytes applied to read-register 17.

It is to be noted that the read-out currents applied to successively established groups of cores corresponding in number to the number of bits in each output byte are always in a direction to reset the cores or to bring their magnetization back to their first conditions. Thus, upon completion of the read-out cycle for every fourth-applied input byte, all cores will be in their first states of magnetization. Thus, all cores in the matrix 10 will have been reset preparatory to a second four-cycle operation, which begins with the fifth input byte. This operation is shown in the timing chart of FIG. 1A. In FIG. 1A, the input bytes appear at spaced intervals. The first eight-bit output byte is produced a time interval after the appearance of the second input byte. After the appearance of four six-bit input bytes and their conversion to three eight-bit output bytes, the cycle starts over again with the production of the first input byte of a second group of four bytes. A time interval after the appearance of the second six-bit input byte of the second group, there appears the first eight-bit output byte of the second group of three output bytes.

With an understanding of the invention as thus far set forth, it will, of course, be understood that the core matrix and the associated circuits have, for convenience, been represented by input circuits corresponding with spaced parallel lines and with output circuits similarly represented by spaced parallel lines but at right angles to the vertical lines of the input circuits. The several input and output circuits as represented by the lines form a checkerboard array on which appear the so-called diagonal circuits. The core-matrix 10 of FIG. 1 may be represented by other symmetrical arrangements. For example, FIG. 1 may be taken as a vertical development of a cylinder having a plurality of spaced circles corresponding with input circuits 1–6 and located lengthwise thereof. The output circuits 1–6 will form a plurality of axial lines on the cylinder and will be spaced one from the other. They will be parallel to the axis of the cylinder. The diagonal circuits 31*d*–34*d* of FIG. 1 on such a cylindrical representation then appear over the surface of the cylinder as helices. If FIG. 1 be taken as the development of a cylinder, taken horizontally, there will be eight circles formed by the eight rows or output circuits and there will be six spaced lines parallel to the axis of the cylinder for the input circuits 1–6 forming the columns of FIG. 1. In this case, the broken-line diagonal circuits 45*d*–47*d* will appear as three helices.

Since it has now been demonstrated that the invention may be illustrated by means of symmetrical arrangements of the circuits, it is to be understood that the actual wiring and appearance of the core matrix 10 and its operation as a byte converter circuit will not in practice necessarily have any similarity to the manner in which the arrangement has been drawn for purposes of explanation and analysis. Such symmetrical arrays have been used for convenience in explaining the invention and, likewise in the claims, for defining the invention in terms of selected symmetrical arrangements of the circuit.

Figure 2:
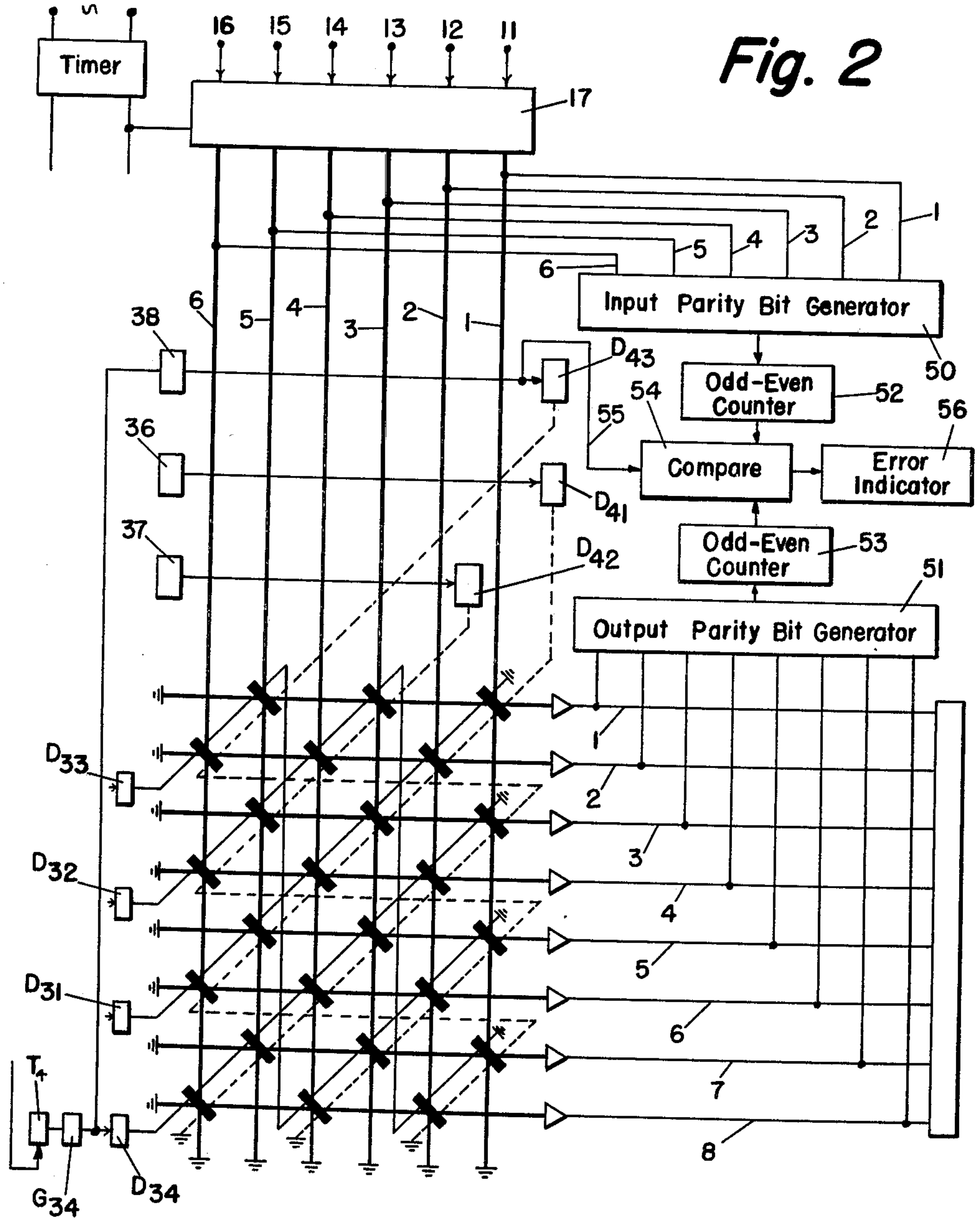
FIG. 2 illustrates a part of the system of FIG. 1 and to which there has been added an error-checking system.

In FIG. 2 there has been illustrated in part the system of FIG. 1, but with the addition thereto of a checking arrangement which includes a parity bit generator 50 having inputs from each of the input circuits 1–6 and an output parity bit generator 51 having input circuits from each of the output circuits forming the rows 1–8. Parity or check bit generators are well understood by those skilled in the art. For the purposes of the present invention, it will be sufficient to describe their purpose and operation in terms of a typical example. If the first input byte comprises, in binary notation, the following:

0 1 1 0 1 1 it will be noted that there are present "zero" bits in even number and "one" bits in even number. When that situation exists, the parity or check bit is zero for even parity. If for the second input byte, there are present an odd number of "ones" and an odd number of "zeros," then the parity bit will be a "one." Thus, the second input byte might comprise:

1 0 0 1 0 1 and the parity bit will be a "one" for even parity.

The foregoing will now be presented in the following table which, it will be seen, includes four input bytes and three output bytes together with the parity bits produced by the parity bit generators 50 and 51:

| Input Byte | Parity Bit from 50 |
|---|---|
| 0 1 1 0 1 1 | 0 |
| 1 0 0 1 0 1 | 1 |
| 1 1 0 0 0 1 | 1 |
| 0 0 1 0 1 0 | 0 |
| **Output Byte** | **Parity Bit from 51** |
| 0 1 0 1 1 0 1 1 | 1 |
| 0 0 0 1 1 0 0 1 | 1 |
| 0 0 1 0 1 0 1 1 | 0 |

The parity bits from generator 50 are applied to an odd-even counter 52, while the parity bits from generator 51 are applied to an odd-even counter 53. The outputs from these two counters are applied to a comparison circuit 54 operable under the control of the third read-out pulse as indicated by the connection by way of conductor 55 to the input of the driver $D_{43}$.

The odd-even counters 52, 53 are likewise well known in the art. They can take the form of a binary trigger, such as a simple AND or gate circuit which changes state upon application thereto of an input pulse regardless of the state in which it was previously. Accordingly, and with reference to the foregoing table, the first parity bit does not change the state of counter 52, but the second input byte does change the state of counter 52 since the parity bit is a "one." It will be remembered that after the second input byte has been applied to the matrix, there is taken therefrom the first output byte. Since its parity bit is a "one," the counter 53 changes state. The third input byte produces a "one" parity bit which returns the counter 52 to its initial state. The comparison circuit 54, though now "seeing" a "zero" from counter 52 and a "one" from counter 53, is ineffective to produce an output, since it is turned off until there is applied thereto a gating pulse by way of conductor 55.

With the appearance of the second output byte, there is produced by generator 51 a "one" parity bit which returns counter 53 to its initial state.

For the fourth input byte, the parity bit is a "zero" and so is the parity bit for the third output byte. This condition will be sensed by the comparison circuit 54 since at the time the third output byte is read out, a gating pulse is applied from the output of gate 38 by way of conductor 55 to render effective the comparison circuit 54. Thus, the comparison circuit 54, after receiving a gating pulse, provides the means for sampling the counters 52 and 53.

Had an error occurred, one or the other of the counters 52 and 53, for the fourth output byte, would have been in an opposite or "one" state for a mismatch or odd count. There would have then been produced from the comparison circuit 54 an output for energization of an error indicator 56. It will thus be seen that the operation of the byte converter is checked at all times for accuracy and in the event of any error, its presence can be effectively signaled.

It is to be understood that the input circuit to odd-even counter 52 carries the parity bits associated with the inputs to or outputs from the read-register 17. In some systems the input parity-bits will arrive with the input bytes through an input parity-bit circuit. In such cases, that input circuit extends directly to odd-even counter 52 and the input generator 50 will be omitted. In each modification, the comparison circuit 54 is ineffective until the appearance of the third output byte. Thus for byte converters embodying the present invention, the comparison circuit 54 will be rendered effective by output bytes respectively separated by intervening output bytes equal in number to the non-common factor of the bits in an input byte minus one.

Each modification of the invention includes cores equal in number to the least common multiple of the bits respectively in the input and in the output bytes. With the circuit drawn in the illustrated rectangular symmetrical arrangement, there are always columns equal in number to the bits in the input byte, and rows equal in number to the bits in each output byte. The least common multiple is the product of the greatest common divisor and the individual factors obtained by dividing each of the numbers by the greatest common divisor. The greatest common divisor for the number of bits in the input byte and the number of bits in the output byte will be referred to as the common factor, while the quotients of the aforesaid divisions will be referred to as the individual or non-common factors. Thus for the system of FIG. 1, the common factor equal to the greatest common divisor is 2. The individual factors are: 3 for the number of bits in each input byte; and 4 for the number of bits in the output byte. There will be diagonal read-in circuits equal in number to the individual or non-common factor of the number of bits in an output byte, and there will be diagonal read-out circuits in number equal to the individual or non-common factor of the number of bits in each input byte. That the foregoing relations obtain will be apparent from a consideration of further modifications of the invention as appearing in FIGS. 3 and 4.

Figure 3:
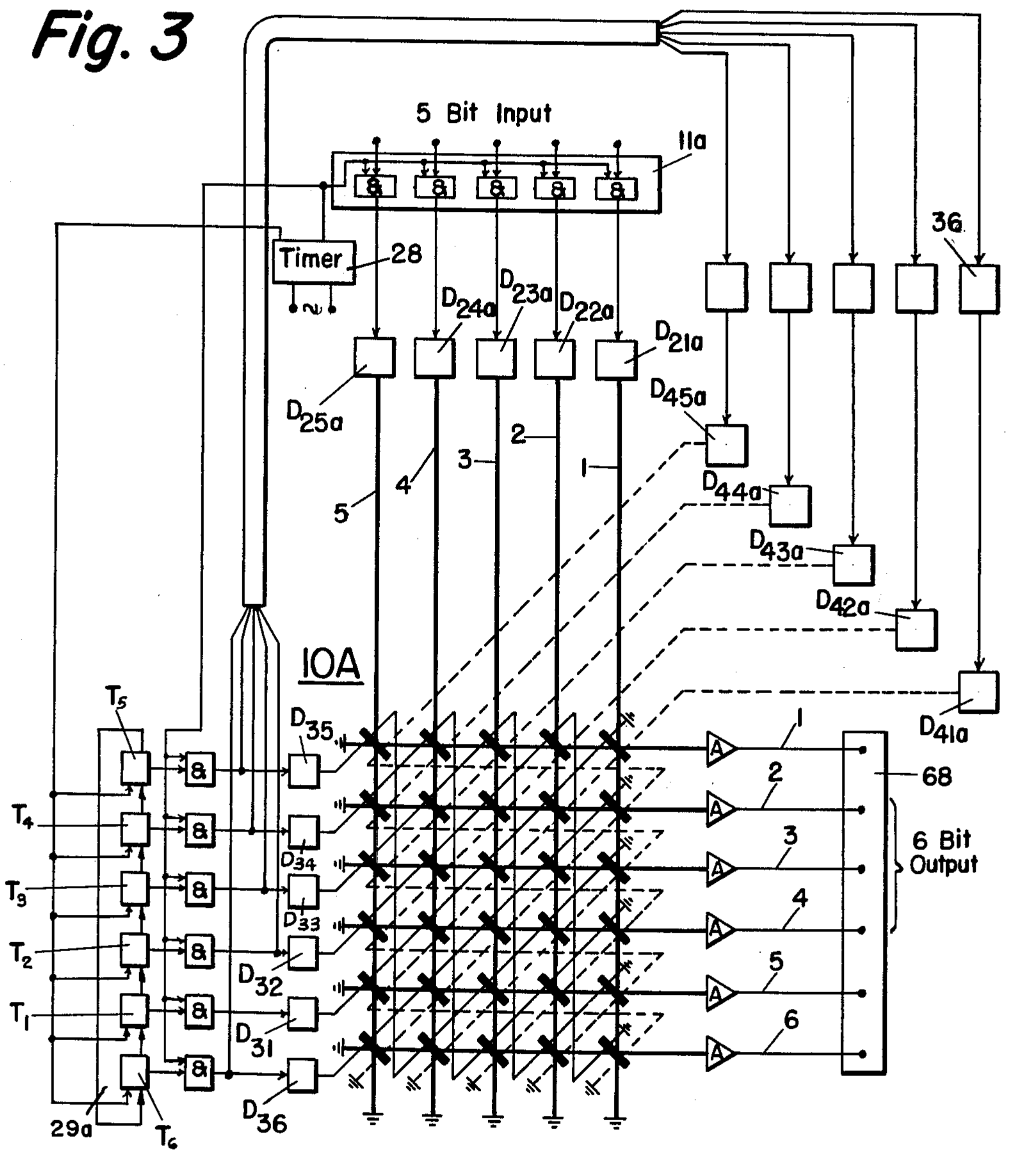
FIG. 3 illustrates a five-bit to six-bit converter system.

Referring now to FIG. 3, there has been illustrated a converter for input bytes and output bytes respectively of five bits and six bits. The least or lowest common multiple is the product of five and six. Accordingly, there are thirty magnetic cores or elements located at the respective intersections of the five columns 1–5 and the six rows 1–6. The gates for the drivers $D_{21a}$–$D_{25a}$ for the input circuits have been illustrated as part of the read-register 11a. Reference characters corresponding with those used in the system of FIG. 1 have been applied to corresponding elements of the system of FIG. 4. In this connection, it will be noted that the ring circuit or counter 29a of FIG. 4 includes six stages for six diagonal read-in circuits. These are equal in number to the non-common factor of 6 for the number of bits in each output byte. In the system of FIG. 3, the common factor is 1. Similarly, it will be noted that there are utilized five driver units $D_{41a}$–$D_{45a}$ for the five diagonal read-out circuits, these, of course, being equal in number to the non-common factor for the number of bits in the input byte.

Figure 3A:
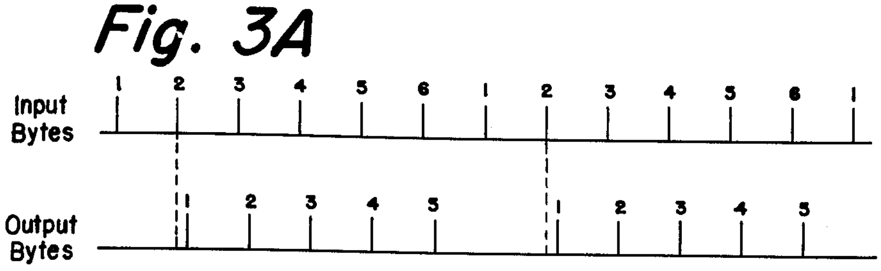
FIG. 3A is a timing diagram of the system of FIG. 3.

As in the system of FIG. 1, five-bit input bytes are in succession fed to read-register 11a. These are read from the register under the control of timer 28 and in manner indicated by the timing diagram of FIG. 4A. Upon application to the converter matrix 10A of the first input byte, there is coincidentally applied a half-write current by driver $D_{31}$ to the first diagonal circuit. Coincidentally with the second input byte, there is applied by driver $D_{32}$ a half-write current to the second diagonal read-in circuit which includes the four cores at columns 2–5 and rows 1–4 and the core at column 1, row 6. After a short time interval, as indicated by the broken line in FIG. 3A and as developed by the delay line 36t, the first read-out circuit is energized by driver $D_{41a}$ to produce a six-bit output byte from the five cores forming the first read-out diagonal circuit and including the core located at column 1, row 6. It is believed that the remaining operations of FIG. 3 will be self-evident from the timing diagram of FIG. 3A, since with the third, fourth, fifth and sixth input bytes there will be in turn produced the second, third, fourth and fifth output bytes. With the development of the fifth output byte, there can be utilized a gating pulse for a checking system, such as illustrated in FIG. 2 though not shown in FIG. 3, to determine that the byte converter is operating without error.

In the systems of FIGS. 1 and 3 there have been demonstrated the principles of the invention as applied to the transformation of input bytes having a lesser number of bits into output bytes having a greater number of bits.

Figure 4:
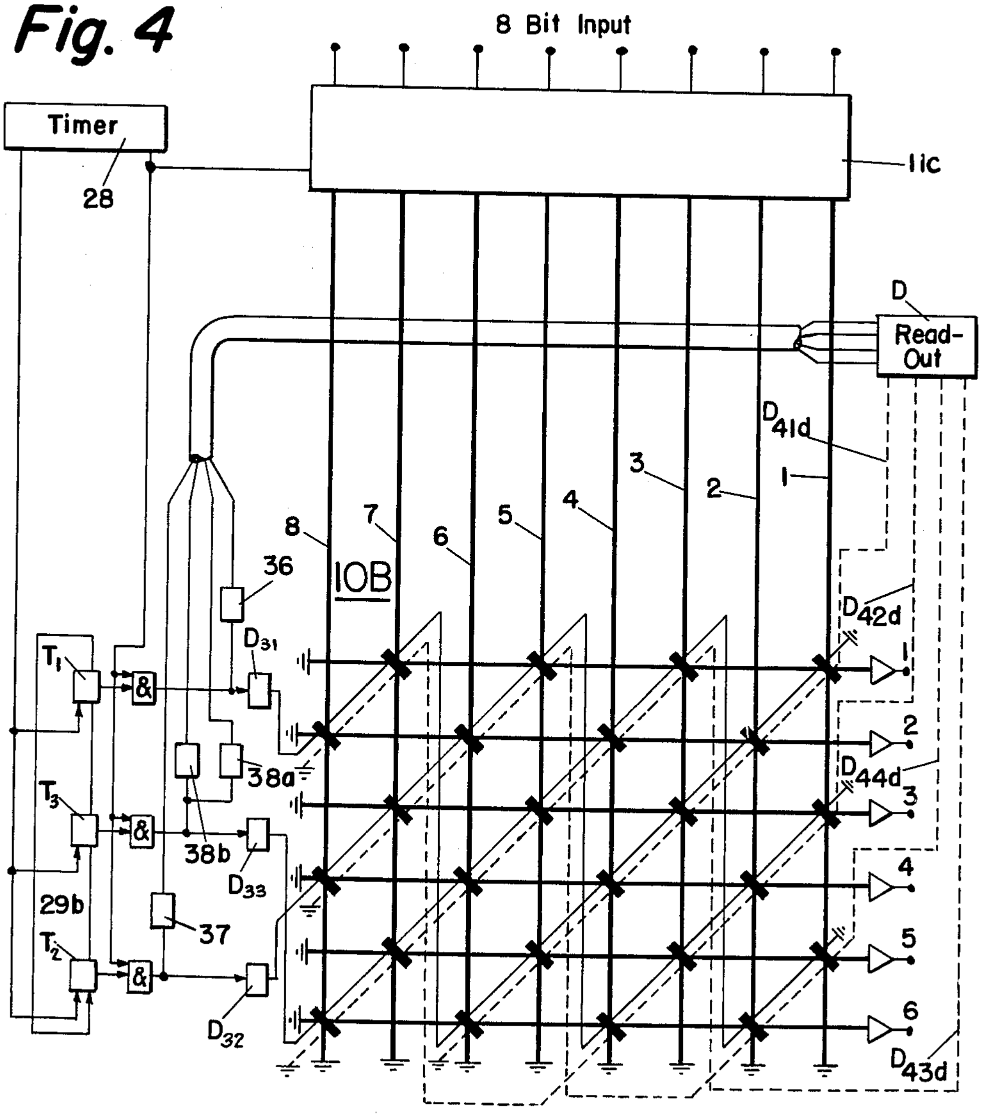
FIG. 4 is an eight-bit to six-bit converter.
Figure 4A:
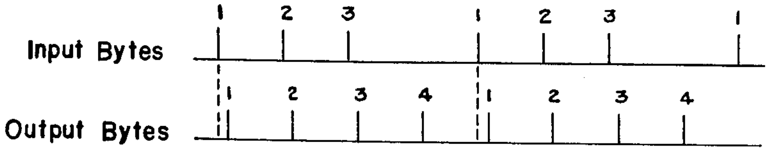
FIG. 4A is a timing diagram of FIG. 4.

In the system of FIG. 4, there has been illustrated, with additional simplifications, a system for converting eight-bit input bytes into six-bit output bytes. Only twenty-four cores, as in the system of FIG. 1, are required, since the least common multiple of eight and six is again twenty-four. The individual factors for the system of FIG. 4 are reversed in their size relative to what they were for the system of FIG. 1. Accordingly, it will be seen that there are only three diagonal read-in circuits respectively energized by half-write drivers $D_{31}$–$D_{33}$. Similarly, the controller 29b of the ring-circuit type includes but three stages $T_1$–$T_3$. There are four diagonal read-out circuits. For simplicity, the read-out drivers have been shown in a box D. As shown by the timing diagram of FIG. 4A, an output byte may be taken from the matrix 10B as soon as there has been applied the first input byte. This input byte, made up of eight bits, is applied to the eight input circuits forming the eight columns. The gates and drivers provided for this purpose are incorporated into the read-register 11c. At the time the first input byte is applied to the input circuits, there is coincidentally produced a half-write current from driver $D_{31}$ to the eight cores included in its diagonal read-in circuit. At the same time, there is applied to the delay line or means 36 a pulse which after a time interval energizes a driver for the first diagonal read-out circuit $D_{41d}$. The drivers for the read-out circuits function as in the previous modifications. In FIG. 4, they have been illustrated as in a box D labeled "Read-Out."

The second input byte produces energization of half-write driver $D_{32}$, and in conjunction with timer 28 applies a pulse to delay line 37 for energization of the second read-out circuit $D_{42d}$. The third input byte, with energization of half-write driver $D_{33}$, applies a pulse to delay means 38a and 38b, each of which has a different delay time. As soon as the shorter delay time expires, the third read-out circuit $D_{43d}$ is energized to produce the third output pulse, and shortly thereafter, the fourth read-out circuit $D_{44d}$ is energized to produce the fourth output byte.

From the foregoing, it will be seen that the byte converter system of the present invention is quite versatile in the forms it may take. It can be utilized for the conversion of input bytes of any number of bits to output bytes of any selected number of bits. Each modification of the invention lends itself to the inclusion of the self-checking features described in detail in connection with FIG. 2.

What is claimed is:

1. A converter circuit comprising input circuits in number corresponding with the number of bits in an input byte, output circuits corresponding in number with the number of bits in an output byte, magnetic cores corresponding in number with the least common multiple of the bits in said input and output bytes, said magnetic cores being arranged in columns and rows with the number of said columns and said rows respectively corresponding in number with said input and output circuits, diagonal read-in circuits extending across said columns and rows and magnetically coupled to cores in different rows and columns, said number of diagonal read-in circuits being equal to the non-common factor of the bits in an output byte, diagonal read-out circuits extending across said columns and rows and magnetically coupled to cores in different columns and rows, said diagonal read-out circuits in number corresponding with the non-common factor of the bits in an input byte, each said diagonal read-in circuit including magnetic cores in number corresponding with the number of bits in an input byte and each said diagonal read-out circuit including magnetic cores in number corresponding with the number of bits in an output byte, and control means for controlling the energization of said read-in circuits and said input circuits for setting the magnetic states of cores included in said read-out circuits until they exceed in number the magnetic cores included in a read-in circuit and for then energizing a read-out circuit to return the magnetic states of its cores to their initial magnetic states, said control means being operable in response to each input byte first in conjunction with one and then with the next of said diagonal read-in circuits.

2. The converter of claim 1 in which said control means includes a controller of the ring type for selective energization of first one and then the next of said diagonal read-in circuits and in which energizing means for said diagonal read-out circuits are energized selectively under the control of said controller.

3. The converter of claim 2 in which there is interposed delay means between said controller of the ring type and said energizing means for said diagonal read-out circuits for energizing said read-out circuits after a time delay at least equal to that required to change the magnetic state of said cores.

4. The converter of claim 1 in which said control means includes core drivers for producing half-write currents upon each of said input circuits corresponding with one of the two notations of the binary system and concurrently a half-write current on one of said diagonal read-in circuits, said half-write currents being cumulative in their effect upon said cores to change the state of magnetization thereof, said control means producing energization of each diagonal read-out circuit of magnitude adequate to change the magnetic state of each core.

5. The converter circuit of claim 1 in which there are associated with said input circuits and said output circuits parity bit-generators, an odd-even counter connected to each of said parity bit-generators, a comparison circuit connected to each of said odd-even counters, and means responsive to the appearance at said output circuits of an output byte separated by intervening output bytes equal to the non-common factor of the bits in an input byte minus one for rendering effective said comparison circuit.

6. A converter circuit comprising a plurality of magnetic cores arranged in columns and rows respectively corresponding with the number of bits in an input byte and the number of bits in an output byte, input circuits and output circuits corresponding respectively in number with the numbers of columns and rows of said magnetic cores and each magnetically coupled to the magnetic cores disposed respectively at selected intersections of said columns and said rows, said cores being present in number equal to the least common multiple of the bits in said input and output bytes, said input bits and said output bits having a common factor and non-common factors, the product of which factors is said least common multiple, read-in circuits in number equal to the non-common factor of the bits in an output byte, each said read-in circuit being magnetically coupled to different cores equal in number to the number of bits in an input byte, read-out circuits present in number equal to the non-common factor of the number of bits in an input byte, each said read-out circuit being magnetically coupled to different cores which in number correspond with the number of bits in an output byte, means operable in response to the application to said input circuits of a succession of input bytes for energization in succession each of said read-in circuits for setting the magnetic states of different cores in said rows and columns to correspond with the bits of each of said input bytes, and means for energizing in succession each of said read-out circuits a time interval after magnetic cores in number at least equal to the number of bits in an output byte have been set to correspond respectively with the bits making up said applied input bytes.

7. The converter of claim 6 in which said energizing means produces coincidentally energization of said input circuits and in said read-in circuits through their magnetic coupling to their respective cores for production of magnetic forces acting cumulatively on said cores, the magnitudes of energization of each one of each pair of said cumulatively acting circuits being insufficient for either to change the magnetic state of a core but in sum being adequate to change the magnetic state of a core.

8. The converter circuit of claim 6 in which there are associated with said input circuits and said output circuits parity bit-generators, odd-even counters respectively connected to the outputs of said parity bit-generators, a comparison circuit connected to said odd-even counters, and means responsive to the appearance at said output circuits of an output byte separated by intervening output bytes equal to the non-common factor of the bits in an input byte minus one.

9. A byte converter circuit comprising a plurality of magnetic cores disposed on the development of the surface of a cylinder, axial lines parallel to the axis of said cylinder forming columns on said development, circles intersecting said axial lines forming rows on said development, helices defined by successive intersections of said axial lines and said circles forming diagonals on said development, magnetic cores disposed at said intersections, the columns and rows respectively corresponding in number with the number of bits in an input byte and in an output byte, the number of bits in said input byte and in said output byte differing one from the other, a plurality of coils inductively coupled to each of said magnetic cores to set and to reset them to establish different magnetic states therein, read-in circuits corresponding in number with the number of bits in an input byte, read-out circuits corresponding in number with the number of bits in an output byte, said read-in and read-out circuits each including a coil associated with the magnetic cores disposed in selected ones of said columns and said rows, diagonal read-in circuits each of which includes coils associated with the magnetic cores disposed on the development of a separate helix, each of said diagonal read-in circuits including coils in number corresponding with the number of bits of an input byte, diagonal read-out circuits each of which includes coils in number corresponding with the number of bits of an output byte, a first of said diagonal read-out circuits including coils associated with cores having applied thereto the first of the successive bits of said input bytes and in number corresponding with the number of bits of an output byte, and said remaining diagonal read-out circuits including coils associated with cores having applied thereto the remaining input bits, whereby bytes having a selected number of bits may be transformed into output bytes having a number of bits differing from those of the input bytes.

10. The byte converter circuit of claim 9 in which said diagonal read-in circuits correspond in number with the number of said cores divided by the number of said read-in circuits and in which the number of said diagonal read-out circuits corresponds with the number of said cores divided by the number of said read-out circuits.

11. A byte converter circuit comprising input circuits corresponding in number with the number of bits in an input byte, output circuits corresponding in number with the number of bits in an output byte, said input circuits when represented by spaced parallel lines and said output circuits when represented by spaced parallel lines at right angles to the lines representing said input circuits forming a plurality of rectangles and in which the input circuits form columns and the output circuits form rows, magnetic cores in number at least equal to the least common multiple of the number of bits in an input byte and the number of bits in an output byte and symmetrically disposed at selected intersections of said lines, diagonal read-in circuits in number equal to the number of cores divided by the number of bits in said input byte, each said diagonal read-in circuit including coils in number equal to the bits in said input byte and each associated with cores in different rows and columns, diagonal read-out circuits corresponding in number with the number of said cores divided by the number of bits in said output byte, each of said diagonal read-out circuits including coils in number equal to the number of bits in said output byte and respectively associated with different rows, each of said read-in and read-out circuits including a coil associated with the magnetic cores located at their respective intersections at apices of said connected rectangles, means for applying to said read-in circuits half-write electrical signals representative of the bits of an input byte for concurrently applying to one diagonal read-in circuit a half-write current, and for successive input bytes applying said half-write current to different diagonal read-in circuits, the concurrence on a core of a half-write signal and a half-write current changing the magnetic state of said core, and means for energizing in succession said diagonal read-out circuits in delayed time-relation with energization of said diagonal read-in circuits for resetting said cores to their initial state and for producing an output signal on each of said output circuits including a core which is thus reset.

12. A converter circuit comprising a plurality of magnetic cores arranged in columns and rows, the number of columns and rows respectively corresponding with the number of bits in an input byte and in an output byte, input circuits and output circuits corresponding respectively in number with the numbers of columns and rows of said magnetic cores and each magnetically coupled to the magnetic cores disposed respectively in said columns and said rows, read-in circuits each magnetically coupled to different cores which cores in number correspond with the number of bits of an input byte, read-out circuits each magnetically coupled to different cores which cores in number correspond with the number of bits in an output byte, means operable in response to the application to said input circuits of a succession of input bytes for energizing in succession said read-in circuits for setting the magnetic states of different cores in said rows and columns to correspond with the bits of each of said input bytes, means for energizing in succession said read-out circuits a time interval after magnetic cores in number at least equal to the number of bits in an output byte have been set to correspond respectively with said input bits, a parity bit-generator connected to be energized from said input circuits, a parity bit-generator connected to be energized from said output circuits, odd-even counters respectively energized from said parity bit-generators, a comparison circuit for receiving the outputs from said odd-even counters, and means for selectively energizing said comparison circuit for determining the presence of error by mismatch between the outputs of said odd-even counters.

13. A byte converter circuit comprising input circuits corresponding in number with the number of bits in an input byte, output circuits corresponding in number with the number of bits in an output byte, magnetic cores in number at least equal to the least common multiple of the number of bits in said input byte and the number of bits in said output byte, each said magnetic core being operable from a first magnetic state to a second magnetic state to represent respectively by said magnetic states the two notations for each bit, each of said input circuits being magnetically coupled to a group of cores in number equal to the number of output circuits, said output circuits being respectively magnetically coupled to groups of cores in number equal to the number of input circuits, half-write circuits magnetically coupled respectively to groups of cores equal in number to said input circuits, read-out circuits magnetically coupled respectively to groups of cores corresponding in number with the number of said output circuits, input means for applying half-write currents to said input circuits respectively representative of at least one notation for each input bit, means operable in synchronism with said input means for applying half-write currents in succession to said half-write circuits for operating each magnetic core in said half-write circuit from one state to a second state upon concurrence at a magnetic core of two of said half-write currents, means operable after the application by way of said input circuits of input signals representative of a number of bits in excess of the number of bits in an output byte for applying in succession to said read-out circuits read-out signals in direction and magnitude to change the states of said magnetic devices from said second to said first state for developing output signals in said output circuits representative of the notations for the bits comprising each said output byte, said means operable in synchronism with said input means comprising a circuit controller having input circuit means and output circuits for controlling the energization of said half-write circuits, a timer operable after a predetermined time interval for controlling said controller to connect said input circuit first to one and then to the next of said output circuits, said means for energizing said read-out circuits including said output circuits of said circuit controller, and signal-delaying means for producing energization of said read-out circuits a time interval after application of said half-write currents to said half-write circuits.

14. A converter circuit comprising a plurality of magnetic cores arranged in columns and rows, the number of columns and rows respectively corresponding with the number of bits in an input byte and in an output byte, input circuits and output circuits corresponding respectively in number with the numbers of columns and rows of said magnetic cores and each magnetically coupled to the magnetic cores disposed respectively in said columns and said rows, read-in circuits each magnetically coupled to different cores which cores in number correspond with the number of bits of an input byte, read-out circuits each magnetically coupled to different cores which cores in number correspond with the number of bits in an output byte, means operable in response to the application to said input circuits of a succession of input bytes for energizing in succession said read-in circuits for setting the magnetic states of different cores in said rows and columns to correspond with the bits of each of said input bytes, means for energizing in succession said read-out circuits a time interval after magnetic cores in number at least equal to the number of bits in an output byte have been set to correspond respectively with said input bits, an input parity-bit circuit, a pair of odd-even counters, one of them connected to and energized by said input parity-bit circuit, a parity bit generator energized from said output circuits and connected to the other of said odd-even counters, means including a comparison circuit for receiving the outputs from said odd-even counters, means selectively energizing said comparison circuit for determining the presence of error by mismatch between the outputs of said odd-even counters, and means responsive to the appearance at said output circuits of output bytes respectively separated by intervening output bytes equal in number to the non-common factor of the bits in an input byte minus one for rendering effective said comparison circuit for determining the presence of error by mismatch between the outputs of said odd-even counters.

15. The combination with a byte converter for receiving input bytes consisting of one number of bits and transmitting output bytes consisting of a different number of bits, of a check circuit comprising an input parity-bit generator for providing an input parity-bit for each input byte, an output parity-bit generator for providing a parity-bit for each output byte, a first counter for receiving said input parity-bits, a second counter for receiving said output parity-bits, means including a comparison circuit for receiving the outputs from said first and second counters, and means selectively energizing said comparison circuit for determining the presence of error by mismatch between said outputs of said first and second counters, said comparison circuit being energized by said last-named means only at the times of predetermined output bytes which are respectively separated by intervening output bytes equal in number to the non-common factor of the bits in an input byte minus one.

16. The combination with a byte converter for receiving input bytes consisting of one number of bits and transmitting output bytes consisting of a different number of bits, of a check circuit comprising means for providing an input check-bit for each input byte, a check-bit generator for providing an output check-bit for each output byte, first counter means for receiving said input check-bits, second counter means for receiving said output check-bits, means including a comparison circuit for receiving the outputs from said first and said second counter means, means for selectively energizing said comparison circuit only when a group of input check-bits and a group of output check-bits both relate to the same selected successive bits, and error-indicating means responsive to a predetermined condition of said comparison circuit when energized.

17. The combination with a byte converter for receiving input bytes consisting of one number of bits and transmitting output bytes consisting of a different number of bits, of a check circuit comprising means for providing an input check-bit for each input byte, a check-bit generator for providing an output check-bit for each output byte, counter means for receiving said input and output check-bits, means for sampling said counter means only when a group of input check-bits and a group of output check-bits both relate to the same selected successive bits, and error-indicating means responsive to a predetermined condition of said counter means when sampled.

18. The combination with a byte converter for receiving input bytes and transmitting output bytes, said input and output bytes each including a plurality of bits, the number of bits in an input byte and the number of bits in an output byte having a common factor and non-common factors, of a check circuit comprising means for providing an input check-bit for each input byte, means for providing an output check-bit for each output byte, means including counter means for receiving said input and output check-bits, and means including counter means for receiving said input and output check-bits, and means for sampling said means including counter means only upon transmission of certain output bytes, said certain output bytes being respectively separated by intervening output bytes equal in number to the non-common factor of the number of bits in an output byte minus one.

19. The combination with a byte converter for receiving input bytes consisting of one number of bits and transmitting output bytes consisting of a different number of bits, of a check circuit comprising means for providing an input even parity check-bit for each input byte, an even parity check-bit generator for providing an output even parity check-bit for each output byte, counter means for receiving said input and output check-bits, means for sampling said counter means only when a group of input check-bits and a group of output check-bits both relate to the same selected successive bits, and means responsive to said counter means for providing an error indication when the count is odd.

References Cited in the file of this patent

UNITED STATES PATENTS

| | | |
|---|---|---|
| 2,691,156 | Saltz et al. | Oct. 5, 1954 |
| 2,691,157 | Stuart-Williams et al. | Oct. 5, 1954 |
| 2,708,267 | Weidenhammer | May 10, 1955 |
| 2,734,184 | Rajchman | Feb. 7, 1956 |
| 2,904,781 | Katz | Sept. 15, 1959 |
| 2,926,334 | Abbott | Feb. 23, 1960 |
| 2,931,014 | Buchholz et al. | Mar. 29, 1960 |
| 2,933,720 | Newhouse et al. | Apr. 19, 1960 |
| 2,997,705 | Freedman | Aug. 22, 1961 |
| 3,011,165 | Angel et al. | Nov. 28, 1961 |

UNITED STATES PATENT OFFICE
CERTIFICATE OF CORRECTION

Patent No. 3,079,597 February 26, 1963

Herbert K. Wild

It is hereby certified that error appears in the above numbered patent requiring correction and that the said Letters Patent should read as corrected below.

Column 11, line 53, for "in said" read -- of said --; column 15, lines 20 and 21, strike out "and means including counter means for receiving said input and output check-bits,".

Signed and sealed this 3rd day of December 1963.

(SEAL)
Attest:
ERNEST W. SWIDER

Attesting Officer

EDWIN L. REYNOLDS

Acting Commissioner of Patents